US012807005B2

(12) United States Patent
Yang

(10) Patent No.: US 12,807,005 B2
(45) Date of Patent: Nov. 24, 2026

(54) REGENERATIVE BRAKING CONTROL SYSTEM AND A METHOD FOR ECO-FRIENDLY VEHICLES IN A TOW MODE

(71) Applicants: HYUNDAI MOTOR COMPANY, Seoul (KR); KIA CORPORATION, Seoul (KR)

(72) Inventor: Dong Il Yang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/198,232

(22) Filed: May 5, 2025

(65) Prior Publication Data

US 2026/0152074 A1 Jun. 4, 2026

(30) Foreign Application Priority Data

Nov. 29, 2024 (KR) ........................ 10-2024-0174305

(51) Int. Cl.
*B60L 7/18* (2006.01)
*B60D 1/24* (2006.01)
(Continued)

(52) U.S. Cl.
CPC ................ *B60L 7/18* (2013.01); *B60D 1/242* (2013.01); *B60D 1/62* (2013.01); *B60L 15/42* (2013.01);
(Continued)

(58) Field of Classification Search
CPC ........ B60L 7/18; B60L 15/42; B60L 2240/10; B60L 2240/14; B60L 2240/26;
(Continued)

(56) References Cited

U.S. PATENT DOCUMENTS

2011/0042154 A1* 2/2011 Bartel ................. B60W 10/184 180/11
2013/0253814 A1* 9/2013 Wirthlin ................... B60D 1/62 701/1
(Continued)

FOREIGN PATENT DOCUMENTS

JP 2013106457 A * 5/2013

OTHER PUBLICATIONS

JP-2013106457-A original and translation (Year: 2013).*

*Primary Examiner* — Frederick M Brushaber
(74) *Attorney, Agent, or Firm* — MCDONNELL BOEHNEN HULBERT & BERGHOFF LLP

(57) ABSTRACT

A regenerative braking control system and method for eco-friendly vehicles in a tow mode adjusts a regenerative braking torque of a towed vehicle depending on the driving situation of a towing vehicle based. The adjustment is determined using a tension detection signal from a load cell on a tow bar. In other words, the regenerative braking torque of the towed vehicle is decreased when the towing vehicle is accelerating or is driving uphill, or increased when the towing vehicle is decelerating or is driving downhill, thereby being capable of preventing an insufficient sense of acceleration of the towing vehicle. In addition, when the tension applied to the tow bar is greater than or equal to a reference durability tension, a driving torque to drive the towed vehicle is increased, thereby being capable of preventing the tow bar from being detached or damaged due to excessive tension.

20 Claims, 3 Drawing Sheets

(51) Int. Cl.
*B60D 1/62* (2006.01)
*B60L 15/42* (2006.01)

(52) U.S. Cl.
CPC ....... *B60L 2240/10* (2013.01); *B60L 2240/14* (2013.01); *B60L 2240/26* (2013.01); *B60L 2240/423* (2013.01); *B60L 2240/642* (2013.01); *B60L 2250/26* (2013.01); *B60L 2260/20* (2013.01)

(58) Field of Classification Search
CPC ......... B60L 2240/423; B60L 2240/642; B60L 2250/26; B60L 2260/20; B60D 1/242; B60D 1/62
See application file for complete search history.

(56) References Cited

U.S. PATENT DOCUMENTS

| | | | | |
|---|---|---|---|---|
| 2019/0217831 | A1* | 7/2019 | Viele | B60D 1/245 |
| 2020/0233410 | A1* | 7/2020 | Burns | B60L 1/00 |
| 2021/0019763 | A1 | 1/2021 | Helles et al. | |
| 2021/0086628 | A1* | 3/2021 | Kava | B60W 50/082 |
| 2022/0396268 | A1* | 12/2022 | Busse | B60D 1/06 |
| 2024/0149863 | A1* | 5/2024 | Shin | B60L 7/18 |
| 2024/0326528 | A1* | 10/2024 | Beech | B60D 1/62 |
| 2025/0108696 | A1* | 4/2025 | Ozawa | B60L 7/18 |
| 2026/0116386 | A1* | 4/2026 | Park | B60W 30/18127 |

* cited by examiner

REGENERATIVE BRAKING CONTROL SYSTEM AND A METHOD FOR ECO-FRIENDLY VEHICLES IN A TOW MODE

CROSS-REFERENCE TO RELATED APPLICATION

This application claims, under 35 U.S.C. § 119(a), the benefit of and priority to Korean Patent Application No. 10-2024-0174305 filed on Nov. 29, 2024, the entire contents of which are incorporated herein by reference.

BACKGROUND

(a) Technical Field

The present disclosure relates to a system and method for controlling regenerative braking in a tow mode for eco-friendly vehicles. More particularly, the present disclosure relates to a regenerative braking control system and method that uses the tension of a tow bar to control both the driving power and regenerative braking of a towed vehicle.

(b) Background Art

Eco-friendly vehicles include: hybrid electric vehicles that use engines and motors as driving sources; electric vehicles that use motors as driving sources; fuel cell vehicles; and the like.

For owners of two or more eco-friendly vehicles depending used for different purposes, a towing function, referred to as a tow mode, may be utilized to transport two or more vehicles to a desired destination when needed.

For example, one vehicle may be set as a towing vehicle that actually drives, and another vehicle may be set as a towed vehicle that is connected to the rear part of the towing vehicle by a tow bar so that both types of vehicles may be taken to the desired destination.

FIG. 1 is a schematic diagram showing a conventional towing charging mode.

As shown in FIG. 1, a mode in which a towed vehicle 200 is connected to the rear part of a towing vehicle 100 by a tow bar 300 when the four wheels of the towing vehicle 100 and the towed vehicle 200 are placed on the ground, and the towing vehicle 100 drives to a destination while towing the towed vehicle 200 is called a flat tow mode.

In order for the towing vehicle 100 to tow the towed vehicle 200 to the destination, the towing vehicle 100 and the towed vehicle 200 are connected by the tow bar 300 so as to enable towing and communication therebetween.

More specifically, the towing vehicle 100 and the towed vehicle 200 may be connected by the tow bar 300 having a cable for controller area network (CAN) communication built therein so as to enable towing and communication therebetween. Additionally, a vehicle controller of the towing vehicle 100 and a vehicle controller of the towed vehicle 200 may be connected by the cable for CAN communication installed in the tow bar 300 so as to transmit and receive data therebetween.

For example, a regenerative braking torque command signal may be transmitted from the vehicle controller of the towing vehicle 100 to the vehicle controller of the towed vehicle 200, and information, such as a battery state of charge (SoC), may be transmitted from the vehicle controller of the towed vehicle 200 to the vehicle controller of the towing vehicle 100, through the cable for CAN communication installed in the tow bar 300.

Therefore, when the towing vehicle 10 and the towed vehicle 200 are connected by the tow bar 300 and the towing vehicle 100 drives to the destination while towing the towed vehicle 200, regenerative braking of a motor mounted in the towed vehicle 200 may be performed. Additionally, the towing charging mode in which a high voltage battery is charged with power generated by the regenerative braking through an inverter may be executed.

However, a constant regenerative braking torque is supplied from the vehicle controller of a towing vehicle to the vehicle controller of the towed vehicle, regardless of whether the towing vehicle is accelerating or decelerating. As a result, the regenerative braking of the towed vehicle is not efficiently performed. This can lead to issues such as a reduced acceleration response of the towing vehicle and potential damage to the tow bar.

For example, when the towing vehicle in which a driver's intention to accelerate is reflected, an insufficient sense of acceleration of the towing vehicle due to regenerative braking of the towed vehicle may occur.

In addition, when the towing vehicle in which the driver's intention to accelerate is reflected, the tension on the tow bar connected between the towing vehicle and the towed vehicle may increase excessively due to the regenerative braking of the towed vehicle. As a result, this may result in detachment of the tow bar or damage to the tow bar.

The above information disclosed in this Background section is only to enhance understanding of the background of the present disclosure. Therefore, the Background section may contain information that does not form the prior art that is already known in this country to a person of ordinary skill in the art.

SUMMARY

The present disclosure has been made in an effort to solve the above-described problems associated with prior art. It is an object of the present disclosure to provide a regenerative braking control system and method for eco-friendly vehicles in a tow mode in which a load cell is mounted on a tow bar connected between a towing vehicle and a towed vehicle. As a result, the regenerative braking torque of the towed vehicle is adjusted depending on the driving situation of the towing vehicle, i.e., the regenerative braking torque of the towed vehicle is decreased when the towing vehicle accelerates or drives uphill, or increased when the towing vehicle decelerates or drives downhill based on a tension detection signal of the tow bar by the load cell. Thus, an insufficient sense of acceleration of the towing vehicle is prevented and regenerative braking of the towed vehicle is enabled to be performed efficiently.

It is another object of the present disclosure to provide a regenerative braking control system and method for eco-friendly vehicles in a tow mode. A load cell is mounted on a tow bar coupled between a towing vehicle and a towed vehicle, so that the driving torque of a driving motor of the towed vehicle is increased when a tension applied to the tow bar is greater than or equal to a reference durability tension based on a tension detection signal of the tow bar from the load cell. This prevents detachment of or damage to the tow bar due to excessive tension.

In one aspect, the present disclosure provides a regenerative braking control system for eco-friendly vehicles in a tow mode. The system includes: a tow bar coupled between a towing vehicle and a towed vehicle so as to enable towing and communication between the tow bar and towing vehicle; and a load cell mounted on the tow bar and configured to detect a tension applied to the tow bar. The system also includes a first vehicle controller of the towing vehicle configured to determine to increase or decrease a regenerative braking torque of the towed vehicle by a predetermined torque based on a detection signal from the load cell. Additionally, the system includes a second vehicle controller of the towed vehicle configured to receive a regenerative braking torque command signal determined by the first vehicle controller and apply the determined regenerative braking torque to a motor of the towed vehicle.

In an embodiment, the first vehicle controller may be configured to command the second vehicle controller to increase a driving torque to drive the towed vehicle by a predetermined torque when the tension applied to the tow bar is determined to be greater than or equal to a reference durability tension greater than a reference tension based on the detection signal from the load cell.

In another embodiment, the regenerative braking control system may further include: an accelerator pedal sensor configured to provide a detection signal to the first vehicle controller to determine a towing vehicle driver's intention to accelerate; a brake pedal sensor configured to provide a detection signal to the first vehicle controller to determine a towing vehicle driver's intention to decelerate; and an inclination sensor configured to provide a detection signal to the first vehicle controller to determine whether the towing vehicle is driving uphill or downhill. The system also includes a weight detection sensor configured to provide a detection signal to the first vehicle controller through the second vehicle controller to determine whether a weight of the towed vehicle has increased or decreased.

In still another embodiment, the first vehicle controller may be configured to determine to decrease the regenerative braking torque of the towed vehicle by the predetermined torque when the tension applied to the tow bar is determined to be greater than or equal to a reference tension and the towing vehicle is determined to be accelerating based on the detection signal from the accelerator pedal sensor.

In yet another embodiment, the first vehicle controller may be configured to determine to decrease the regenerative braking torque of the towed vehicle by the predetermined torque when the tension applied to the tow bar is determined to be greater than or equal to a reference tension and the towing vehicle is determined to be driving on an uphill slope with a designated angle or more based on the detection signal from the inclination sensor.

In still yet another embodiment, the first vehicle controller may be configured to determine to decrease the regenerative braking torque of the towed vehicle by the predetermined torque when the tension applied to the tow bar is determined to be greater than or equal to a reference tension and the weight of the towed vehicle is determined to be greater than or equal to a reference value.

In a further embodiment, the first vehicle controller may be configured to determine to increase the regenerative braking torque of the towed vehicle by the predetermined torque when the tension applied to the tow bar is determined to be less a reference tension and the towing vehicle is determined to be decelerating based on the detection signal from the accelerator pedal sensor.

In another further embodiment, the first vehicle controller may be configured to determine to increase the regenerative braking torque of the towed vehicle by the predetermined torque when the tension applied to the tow bar is determined to be less than a reference tension and the towing vehicle is determined to be driving on a downhill slope with less than a designated angle based on the detection signal from the inclination sensor.

In still another further embodiment, the first vehicle controller may be configured to determine to increase the regenerative braking torque of the towed vehicle by the predetermined torque when the tension applied to the tow bar is determined to be less than a reference tension and the weight of the towed vehicle is determined to be less than a reference value.

In another aspect, the present disclosure provides a regenerative braking control method for eco-friendly vehicles in a tow mode. The method includes: connecting a towing vehicle and a towed vehicle by a tow bar so as to enable towing and communication between the towing vehicle and the towed vehicle; detecting a tension applied to the tow bar by a load cell mounted on the tow bar; and determining, by a first vehicle controller of the towing vehicle, to increase or decrease a regenerative braking torque of the towed vehicle by a predetermined torque based on a detection signal from the load cell. The method also includes applying, by a second vehicle controller of the towed vehicle having received a regenerative braking torque command signal determined by the first vehicle controller, the determined regenerative braking torque to a motor of the towed vehicle.

In an embodiment, the first vehicle controller may command the second vehicle controller to increase a driving torque to drive the towed vehicle by a predetermined torque when the tension applied to the tow bar is determined to be greater than or equal to a reference durability tension greater than a reference tension based on the detection signal from the load cell.

In another embodiment, the method may further include: providing a detection signal to determine a towing vehicle driver's intention to accelerate from an accelerator pedal sensor of the towing vehicle to the first vehicle controller; providing a detection signal to determine a towing vehicle driver's intention to decelerate from a brake pedal sensor of the towing vehicle to the first vehicle controller; and providing a detection signal to determine whether the towing vehicle is driving uphill or downhill from an inclination sensor of the towing vehicle to the first vehicle controller. The method also includes: providing a detection signal to determine whether a weight of the towed vehicle has increased or decreased from a weight detection sensor of the towed vehicle to the first vehicle controller through the second vehicle controller of the towed vehicle.

In still another embodiment, the first vehicle controller may determine to decrease the regenerative braking torque of the towed vehicle by the predetermined torque when the tension applied to the tow bar is determined to be greater than or equal to a reference tension and the towing vehicle is determined to be accelerating based on the detection signal from the accelerator pedal sensor.

In yet another embodiment, the first vehicle controller may determine to decrease the regenerative braking torque of the towed vehicle by the predetermined torque when the tension applied to the tow bar is determined to be greater than or equal to a reference tension and the towing vehicle is determined to be driving on an uphill slope with a designated angle or more based on the detection signal from the inclination sensor.

In still yet another embodiment, the first vehicle controller may determine to decrease the regenerative braking torque of the towed vehicle by the predetermined torque when the tension applied to the tow bar is determined to be greater than or equal to a reference tension and the weight of the towed vehicle is determined to be greater than or equal to a reference value.

In a further embodiment, the first vehicle controller may determine to increase the regenerative braking torque of the towed vehicle by the predetermined torque when the tension applied to the tow bar is determined to be less a reference tension and the towing vehicle is determined to be decelerating based on the detection signal from the accelerator pedal sensor.

In another further embodiment, the first vehicle controller may determine to increase the regenerative braking torque of the towed vehicle by the predetermined torque when the tension applied to the tow bar is determined to be less than a reference tension and the towing vehicle is determined to be driving on a downhill slope with less than a designated angle based on the detection signal from the inclination sensor.

In still another further embodiment, the first vehicle controller may determine to increase the regenerative braking torque of the towed vehicle by the predetermined torque when the tension applied to the tow bar is determined to be less than a reference tension and the weight of the towed vehicle is determined to be less than a reference value.

Other aspects and embodiments of the present disclosure are discussed below.

BRIEF DESCRIPTION OF THE DRAWINGS

The above and other features of the present disclosure are now described in detail with reference to certain embodiments thereof illustrated in the accompanying drawings which are given hereinbelow by way of illustration only, and thus are not limitative of the present disclosure, and wherein.

Figure 1:
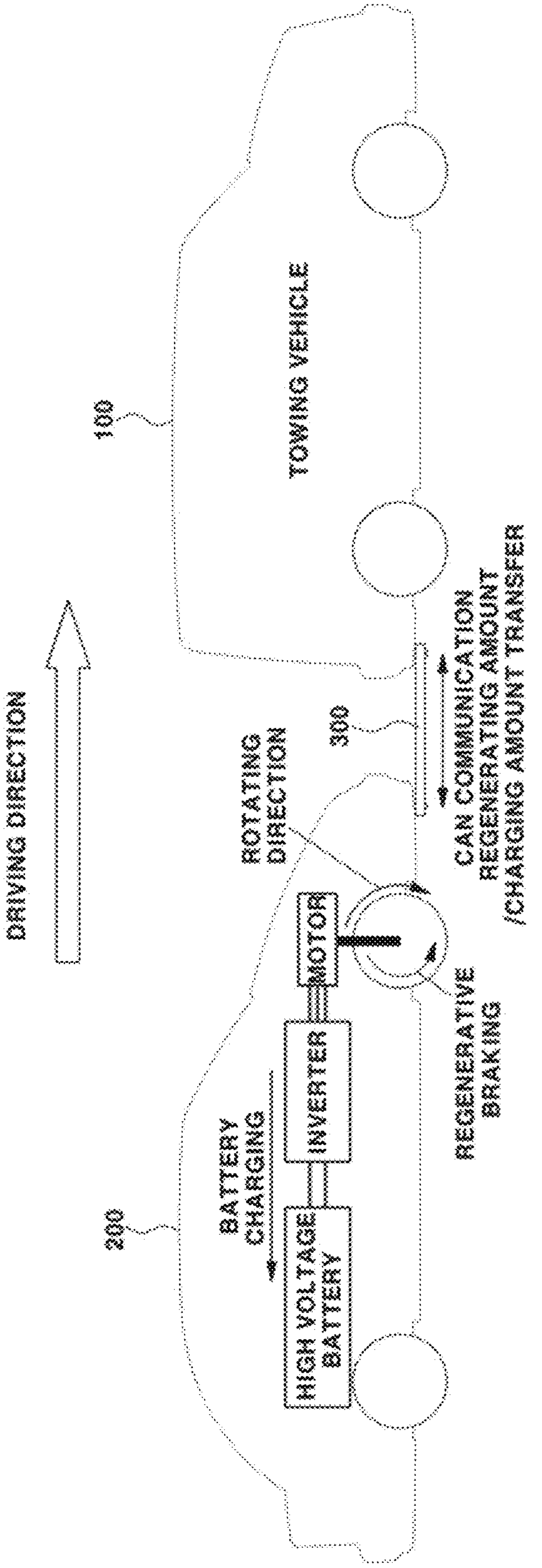
FIG.1 Related Art
FIG. 1 is a schematic diagram showing a conventional towing charging mode.

It should be understood that the appended drawings are not necessarily drawn to scale, presenting a somewhat simplified representation of various features illustrative of the basic principles of the present disclosure. The specific design features of the present disclosure as disclosed herein, including, for example, specific dimensions, orientations, locations, and shapes should be determined in part by the particular intended application and use environment.

In the figures, reference numbers refer to the same or equivalent parts of the present disclosure throughout the several figures of the drawing.

DETAILED DESCRIPTION

Specific structural or functional descriptions set forth in the embodiments of the present disclosure are merely exemplarily and given to describe the embodiments depending on the concept of the present disclosure. The embodiments depending on the concept of the present disclosure may be embodied in different forms. Further, the present disclosure should not be construed as being limited to the embodiments set forth herein, and it should be understood that the present disclosure includes all modifications, equivalents, or substitutes included in the spirit and technical scope of the present disclosure.

In the following description of the embodiments, terms, such as "first," "second," and the like, are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the present disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," and the like.

When a controller, component, device, element, part, unit, module, or the like of the present disclosure is described as having a purpose or performing an operation, function, or the like, the controller, component, device, element, part, unit, or module should be considered herein as being "configured to" meet that purpose or perform that operation or function. Each controller, component, device, element, part, unit, module, and the like may separately embody or be included with a processor and a memory, such as a non-transitory computer-readable media, as part of the apparatus.

Wherever possible, the same reference numbers are used throughout the following description to refer to the same or like parts. The terminology used herein is for the purpose of describing particular embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Hereinafter, embodiments of the present disclosure are described in detail with reference to the accompanying drawings.

Figure 2:
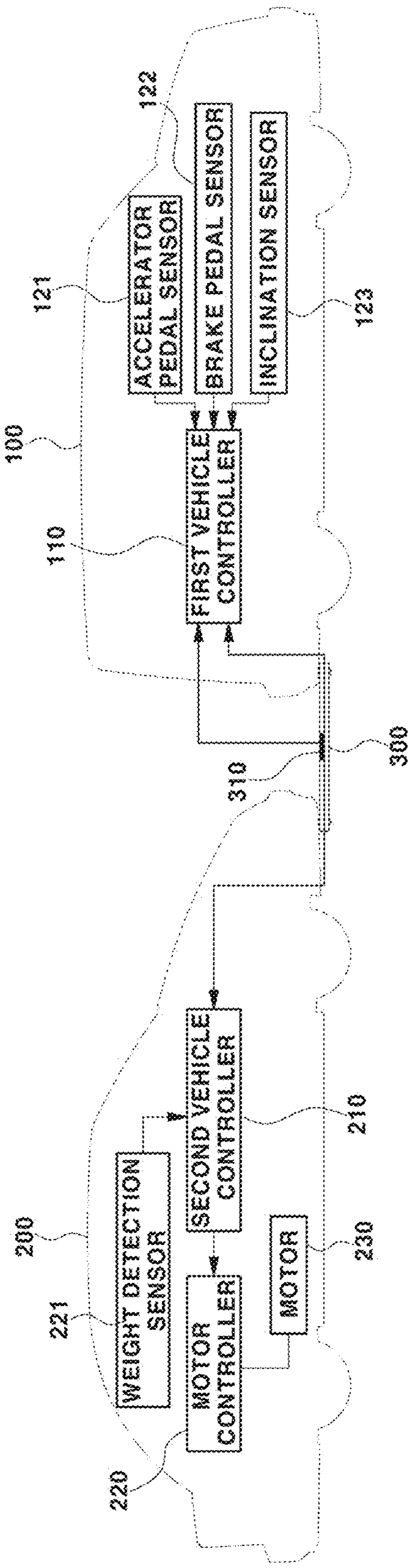
FIG. 2 is a control block diagram showing a regenerative braking control system for eco-friendly vehicles in a tow mode according to the present disclosure.

FIG. 2 is a control block diagram showing a regenerative braking control system for eco-friendly vehicles in a tow mode according to the present disclosure.

As shown in FIG. 2, in order for a towing vehicle 100 to tow a towed vehicle 200 to a destination, the towing vehicle 100 and the towed vehicle 200 are connected by a tow bar 300, which is a kind of connector that enables towing and communication therebetween.

For this purpose, the towing vehicle 100 and the towed vehicle 200 may be connected (e.g., coupled) by the tow bar 300 including a cable for controller area network (CAN) communication built therein so as to enable towing and communication therebetween. Additionally, a first vehicle controller 110 mounted in the towing vehicle 100 and a second vehicle controller 210 mounted in the towed vehicle 200 may be connected by the cable for CAN communication installed in the tow bar 300 so as to enable transmission and reception of vehicle information for driving therebetween.

In other words, because a communication module (e.g., a CAN communication module) is installed in the first vehicle controller 110 of the towing vehicle 100 and the second vehicle controller 210 of the towed vehicle 200, the first vehicle controller 110 and the second vehicle controller 210 may be connected by the cable for CAN communication installed in the tow bar 300 so as to enable transmission and reception of the vehicle information for driving therebetween.

Both the towing vehicle 100 and the towed vehicle 200 may be one of hybrid electric vehicles, electric vehicles, and fuel cell vehicles that are driven by motors.

Accordingly, in the above-described state in which the towing vehicle 10 and the towed vehicle 200 are connected by the tow bar 300, and the towing vehicle 100 drives to the destination while towing the towed vehicle 200, regenerative braking of a motor 230 mounted in the towed vehicle 200 may be performed, and the towing charging mode in which a high voltage battery is charged with power generated by the regenerative braking through an inverter may be executed.

A load cell 310 is mounted on the tow bar 300 connected between the towing vehicle 100 and the towed vehicle 200. As a result, the regenerative braking torque of the towed vehicle 200 may be adjusted depending on the driving situation of the towing vehicle 100 based on a tension detection signal of the tow bar 300 by the load cell 310.

For this purpose, the regenerative braking control system in the tow mode according to the present disclosure includes, as shown in FIG. 2, the tow bar 300 that is connected between the towing vehicle 100 and the towed vehicle 200 so as to enable towing and communication therebetween. The load cell 310 mounted on the tow bar 300 is configured to detect a tension applied to the tow bar 300. The first control unit 110 of the towing vehicle 100 is configured to determine whether to increase or decrease the regenerative braking torque of the towed vehicle 200 by a predetermined torque based on the tension detection signal from the load cell 310. The second vehicle controller 310 of the towed vehicle 200 is configured to receive a regenerative braking torque command signal determined by the first vehicle controller 110 and apply the determined regenerative braking torque to the motor 230 of the towed vehicle 200.

The first vehicle controller 110 determines whether the tension applied to the tow bar 300 is greater than or equal to a reference durability tension, which is greater than a reference tension, based on the tension detection signal from the load cell 310. Additionally, the first vehicle controller 110 commands the second vehicle controller 210 to increase a driving torque for driving the towed vehicle 200 by a predetermined torque when the tension applied to the tow bar 300 is greater than or equal to the reference durability tension.

For reference, the reference tension refers to a predetermined tension value used to determine whether to increase or decrease the regenerative braking torque of the towed vehicle 200. The reference durability tension refers to a predetermined tension value used to determine whether the tow bar 300 is detached or damaged.

Accordingly, when the towing vehicle 100 accelerates while towing the towed vehicle 200 connected to the towing vehicle 100 by the tow bar 300, and the tension applied to the tow bar 300 is greater than or equal to the reference durability tension based on the tension detection signal from the load cell 310, a driving torque increased by the predetermined torque may be applied to the motor 230 of the towed vehicle 200.

For this purpose, a command to increase the motor driving torque of the towed vehicle 200 by the predetermined torque is transmitted from the first vehicle controller 110 to a motor controller 220, which is a lower-level control unit, through the second vehicle controller 210, which is an upper-level control unit, of the towed vehicle 200. The driving torque increased by the predetermined torque may be applied to the motor 230 of the towed vehicle 200 under the control of the motor controller 220.

As such, when the tension detected by the load cell 310 of the tow bar 300 is greater than or equal to the reference durability tension during acceleration of the towing vehicle 100, the driving torque for driving the motor 230 of the towed vehicle 200 is increased by the predetermined torque. As a result, the excessive tension applied to the tow bar 300 due to regenerative braking of the towed vehicle 200 is reduced and the tow bar 300 is prevented from being detached or damaged due to the excessive tension.

The regenerative braking control system in the tow mode according to the present disclosure includes an accelerator pedal sensor 121 of the towing vehicle 100, a brake pedal sensor 122 of the towing vehicle 100, an inclination sensor 123 of the towing vehicle 100, and a weight detection sensor 221 of the towed vehicle 200. These sensors provide input to the first vehicle controller 110, enabling the first vehicle controller 110 to determine whether to increase or decrease the regenerative braking torque of the towed vehicle 200.

The accelerator pedal sensor 121 is configured to provide a signal indicating a detected amount of depression applied to an accelerator pedal to the first vehicle controller 110 in order to determine a towing vehicle driver's intention to accelerate. The brake pedal sensor 122 is configured to provide a signal indicating a detected amount of depression applied to a brake pedal to the first vehicle controller 110 in order to determine a towing vehicle driver's intention to decelerate. The inclination sensor 123 is configured to provide a detection signal to determine whether the towing vehicle 100 is driving uphill or downhill to the first vehicle controller 110.

In addition, the weight detection sensor 221 provides a detection signal to determine whether the weight of the towed vehicle 200 has increased or decreased based on a load to the second vehicle controller 210, and the provided detection signal may be transmitted from the second vehicle controller 210 to the first vehicle controller 110 through the cable installed in the tow bar 300.

Accordingly, in order to resolve an insufficient sense of acceleration of the towing vehicle 100 due to regenerative braking of the towed vehicle 200, the first vehicle controller 110 may determine to decrease the regenerative braking torque of the towed vehicle 200 based on the detection signals from the accelerator pedal sensor 121 and the inclination sensor 123 of the towing vehicle 100 and the weight detection sensor 221 of the towed vehicle 200. Alternatively, in order to obtain a larger regenerative braking amount of the towed vehicle 200, the first vehicle controller 110 may determine to increase the regenerative braking torque of the towed vehicle 200 based on the detection signals from the brake pedal sensor 122 and the inclination sensor 123 of the towing vehicle 100 and the weight detection sensor 221 of the towed vehicle 200.

For example, the first vehicle controller 110 is configured to determine to decrease the regenerative braking torque of the towed vehicle 200 by the predetermined torque, when the tension applied to the tow bar 300 is determined to be greater than or equal to the reference tension based on the tension detection signal from the load cell 310 and the towed vehicle 200 is determined to be accelerating depending on a driver's intention to accelerate based on the detection signal from the accelerator pedal sensor 121.

Alternatively, the first vehicle controller 110 is configured to determine to decrease the regenerative braking torque of the towed vehicle 200 by the predetermined torque, when the tension applied to the tow bar 300 is determined to be greater than or equal to the reference tension based on the tension detection signal from the load cell 310 and the towing vehicle 100 is determined to be driving on an uphill slope with a designated angle or more based on the detection signal from the inclination sensor 123.

Alternatively, the first vehicle controller 110 is configured to determine to decrease the regenerative braking torque of the towed vehicle 200 by the predetermined torque, when the tension applied to the tow bar 300 is determined to be greater than or equal to the reference tension based on the tension detection signal from the load cell 310 and the weight of the towed vehicle 200 is determined to be greater than or equal to a reference value based on the detection signal from the weight detection sensor 221.

A command to decrease the motor regenerative braking torque of the towed vehicle 200 by the predetermined torque may be transmitted from the first vehicle controller 110 to the motor controller 220, which is the lower-level control unit, through the second vehicle controller 210, which is the upper-level control unit, of the towed vehicle 200. The regenerative braking torque decreased by the predetermined torque may be applied to the motor 230 of the towed vehicle 200 under the control of the motor controller 220.

As such, when the tension detected by the load cell 310 of the tow bar 300 is greater than or equal to the reference tension, and the towed vehicle 100 is accelerating or is driving uphill or the weight of the towed vehicle 200 is greater than or equal to the reference value, the regenerative braking torque of the towed vehicle 200 is adjusted to be decreased, thereby preventing an insufficient sense of acceleration of the towing vehicle 100.

On the other hand, the first vehicle controller 110 is configured to determine to increase the regenerative braking torque of the towed vehicle 200 by the predetermined torque, when the tension applied to the tow bar 300 is determined to be less than the reference tension based on the tension detection signal from the load cell 310 and the towed vehicle 200 is determined to be decelerating depending on a driver's intention based on the detection signal from the brake pedal sensor 122.

Alternatively, the first vehicle controller 110 is configured to determine to increase the regenerative braking torque of the towed vehicle 200 by the predetermined torque, when the tension applied to the tow bar 300 is determined to be less than the reference tension based on the tension detection signal from the load cell 310 and the towing vehicle 100 is determined to be driving on a downhill slope with less than a designated angle based on the detection signal from the inclination sensor 123.

Alternatively, the first vehicle controller 110 is configured to determine to increase the regenerative braking torque of the towed vehicle 200 by the predetermined torque, when the tension applied to the tow bar 300 is determined to be less than the reference tension based on the tension detection signal from the load cell 310 and the weight of the towed vehicle 200 is determined to be less than the reference value based on the detection signal from the weight detection sensor 221.

A command to increase the motor regenerative braking torque of the towed vehicle 200 by the predetermined torque may be transmitted from the first vehicle controller 110 to the motor controller 220, which is the lower-level control unit, through the second vehicle controller 210, which is the upper-level control unit, of the towed vehicle 200. The regenerative braking torque increased by the predetermined torque may be applied to the motor 230 of the towed vehicle 200 under the control of the motor controller 220.

As such, when the tension detected by the load cell 310 of the tow bar 300 is less than the reference tension, and the towed vehicle 100 is decelerating or is driving downhill or the weight of the towed vehicle 200 is less than the reference value, the regenerative braking torque of the towed vehicle 200 is adjusted to be increased. As a result, regenerative braking of the towed vehicle 200 is performed more efficiently, such as obtaining a larger regenerative braking amount by the motor 230 of the towed vehicle 200.

Hereinafter, a regenerative braking control method for eco-friendly vehicles in a tow mode according to the present disclosure is sequentially described.

Figure 3:
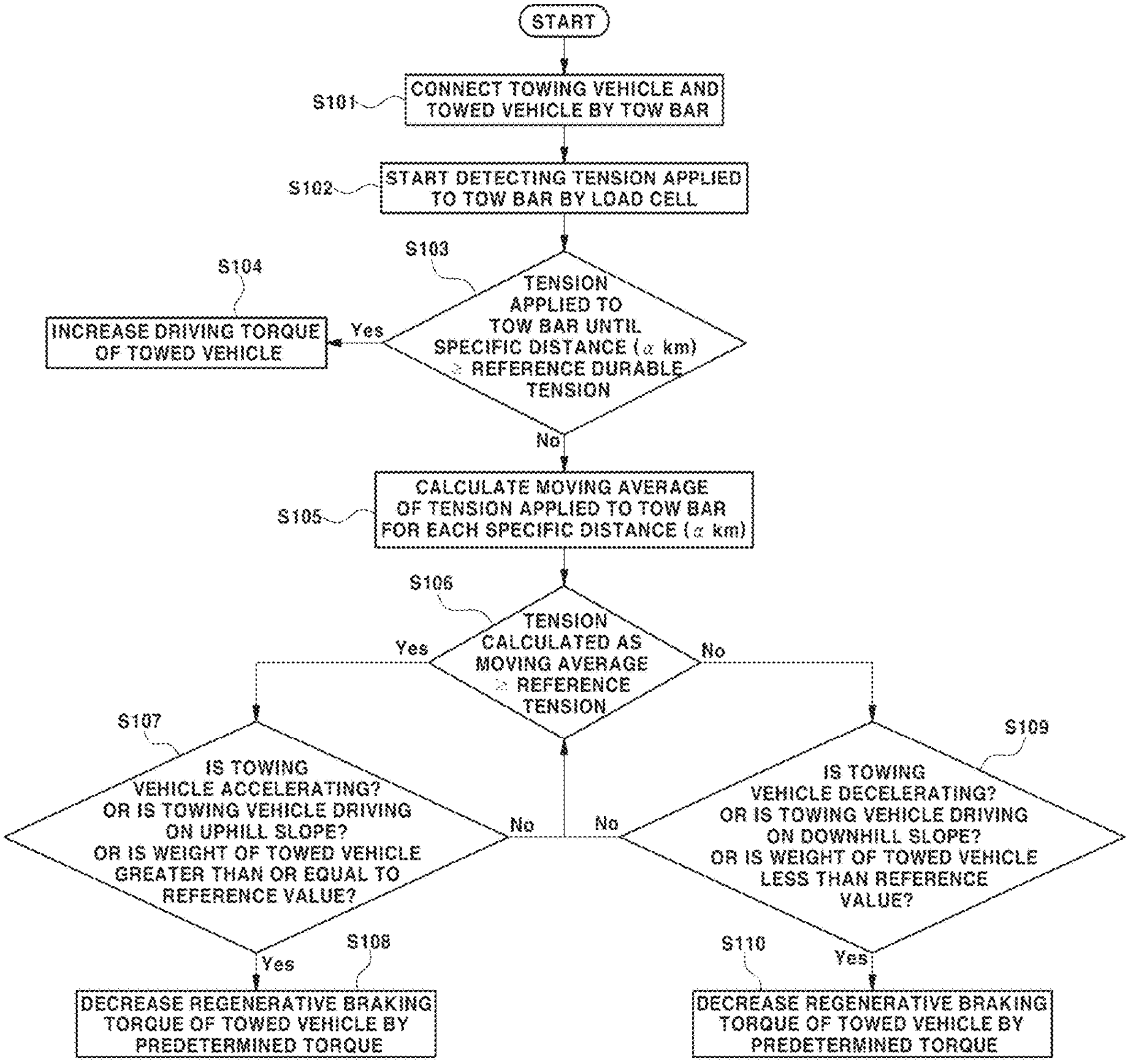
FIG. 3 is a flowchart illustrating a regenerative braking control method for eco-friendly vehicles in a tow mode according to the present disclosure.

FIG. 3 is a flowchart illustrating the regenerative braking control method for eco-friendly vehicles in the tow mode according to the present disclosure.

First, in order to activate the towing charging mode, the towing vehicle 100 and the towed vehicle 200 are connected using the tow bar 300 having the cable for CAN communication built therein so as to enable towing and communication therebetween (S101).

Accordingly, the first vehicle controller 110 mounted in the towing vehicle 100 and the second vehicle controller 210 mounted in the towed vehicle 200 may be connected by the cable for CAN communication installed in the tow bar 300 so as to enable transmission and reception of vehicle information for driving therebetween.

Thereafter, when the towing vehicle 100 starts driving to tow the towed vehicle 200 connected to the towing vehicle 100 by the tow bar 300, a tension applied to the tow bar 300 is detected by the load cell 310 mounted on the tow bar 300 (S102).

Subsequently, considering that an excessive tension may be applied to the tow bar 300 due to regenerative braking of the towed vehicle 200 during acceleration of the towing vehicle 100, the first vehicle controller 110 monitors the towing process. When the towing vehicle 100 has traveled a specific distance (α km) from a driving start point, the first vehicle controller 110 compares the tension detected by the load cell 310, i.e., the tension applied to the tow bar 300, with the reference durability tension (S103).

As a result of the comparison, when the tension applied to the tow bar 300 is determined to be greater than or equal to the reference durability tension, control to increase the driving torque of the towed vehicle 200 is performed (S104).

For this purpose, a command signal to increase the motor regenerative braking torque of the towed vehicle 200 by a predetermined torque may be transmitted from the first vehicle controller 110 to the motor controller 220, which is the lower-level control unit, through the second vehicle controller 210, which is the upper-level control unit, of the towed vehicle 200. The driving torque increased by the predetermined torque may be applied to the motor 230 of the towed vehicle 200 under the control of the motor controller 220.

Therefore, when the tension detected by the load cell 310 of the tow bar 300 is greater than or equal to the reference durability tension during the acceleration of the towing vehicle 100, the driving torque for driving the motor 230 of the towed vehicle 200 is increased by the predetermined torque, thereby being capable of reducing the excessive tension applied to the tow bar 300 due to regenerative braking of the towed vehicle 200 and easily preventing the tow bar 300 from being detached or damaged due to the excessive tension.

The tension applied to the tow bar 300 is continuously detected by the load cell 310 mounted on the tow bar 300 during towing of the towing vehicle 100.

Accordingly, when the towing vehicle 100 travels more than the specific distance (α km) from the driving start point, the first vehicle controller 110 calculates a moving average for the tension detected by the load cell 310, i.e., the tension applied to the tow bar 300, for each specific distance (α km) (S105).

Next, the first vehicle controller 110 compares the tension applied to the tow bar 300, i.e., the tension calculated as the moving average, with the predetermined reference tension (S106).

Accordingly, the first vehicle controller 110 of the towing vehicle 100 determines to increase or decrease the regenerative braking torque of the towed vehicle 200 by the predetermined torque based on a result of the comparison in operation S106, and the second vehicle controller 210 of the towed vehicle 100 that has received a regenerative braking torque command signal determined by the first vehicle controller 110 applies the determined regenerative braking torque to the motor 230 of the towed vehicle 200.

For this purpose, first, a signal indicating detection of a driver's intention to accelerate from the accelerator pedal sensor 121 of the towing vehicle 100 is provided to the first vehicle controller 110, a signal indicating detection of a driver's intention to decelerate from the brake pedal sensor 122 of the towing vehicle 100 is provided to the first vehicle controller 110, a signal indicating detection as to whether the towing vehicle 100 is driving uphill or downhill from the inclination sensor 123 of the towing vehicle 100 is provided to the first vehicle controller 110, and a signal indicating detection as to whether the weight of the towed vehicle 200 has increased or decreased from the weight detection sensor 221 of the towed vehicle 200 is provided from the second vehicle controller 210 of the towed vehicle 200 to the first vehicle controller 110 through the cable installed in the tow bar 300.

To address an insufficient sense of acceleration of the towing vehicle 100 due to the regenerative braking of the towed vehicle 200, the first vehicle controller 110 may determine to decrease the regenerative braking torque of the towed vehicle 200 based on the detection signals from the accelerator pedal sensor 121 and the inclination sensor 123 of the towing vehicle 100, as well as the weight detection sensor 221 of the towed vehicle 200. Alternatively, in order to obtain a larger regenerative braking amount of the towed vehicle 200, the first vehicle controller 110 may determine to increase the regenerative braking torque of the towed vehicle 200 based on the detection signals from the brake pedal sensor 122, the inclination sensor 123 of the towing vehicle 100, and the weight detection sensor 221 of the towed vehicle 200.

As a result of the comparison in operation S106, when the tension applied to the tow bar 300, i.e., the tension calculated as the moving average, based on the detection signal from the load cell 310 is greater than or equal to the reference tension, the first vehicle controller 110 determines that a sense of acceleration of the towing vehicle 100 is insufficient due to regenerative braking of the towed vehicle 200.

Accordingly, after the tension applied to the tow bar 300, i.e., the tension calculated as the moving average, is determined to be greater than or equal to the reference tension, the first vehicle controller 110 determines whether the towing vehicle 100 is accelerating depending on a driver's intention to accelerate based on the detection signal from the accelerator pedal sensor 121 (S107). As a result of the determination, when the towing vehicle 100 is determined to be accelerating depending on the driver's intention to accelerate, the first vehicle controller 110 determines to decrease the regenerative braking torque of the towed vehicle 200 by the predetermined torque (S108).

Alternatively, after the tension applied to the tow bar 300, i.e., the tension calculated as the moving average, is determined to be greater than or equal to the reference tension, the first vehicle controller 110 determines whether the towing vehicle 100 is driving on an uphill slope with the designated angle or more based on the detection signal from the inclination sensor 123 (S107). As a result of the determination, when the towing vehicle 100 is determined to be driving on the uphill slope with the designated angle or more, the first vehicle controller 110 determines to decrease the regenerative braking torque of the towed vehicle 200 by the predetermined torque (S108).

Alternatively, after the tension applied to the tow bar 300, i.e., the tension calculated as the moving average, is determined to be greater than or equal to the reference tension, the first vehicle controller 110 determines whether the weight of the towed vehicle 200 is greater than or equal to the reference value based on the detection signal from the weight detection sensor 221 (S107). As a result of the determination, when the weight of the towed vehicle 200 is determined to be greater than or equal to the reference value, the first vehicle controller 110 determines to decrease the regenerative braking torque of the towed vehicle 200 by the predetermined torque (S108).

A command to decrease the motor regenerative braking torque of the towed vehicle 200 by the predetermined torque may be transmitted from the first vehicle controller 110 to the motor controller 220, which is the lower-level control unit, through the second vehicle controller 210, which is the upper-level control unit, of the towed vehicle 200. The regenerative braking torque decreased by the predetermined torque may be applied to the motor 230 of the towed vehicle 200 under the control of the motor controller 220.

As such, when the tension detected by the load cell 310 of the tow bar 300, i.e., the tension calculated as the moving average, is greater than or equal to the reference tension, and the towed vehicle 100 is accelerating or is driving uphill or the weight of the towed vehicle 200 is greater than or equal to the reference value, the regenerative braking torque of the towed vehicle 200 is adjusted to be decreased, thereby preventing an insufficient sense of acceleration of the towing vehicle 100.

On the other hand, as the result of the comparison in operation S106, when the tension applied to the tow bar 300, i.e., the tension calculated as the moving average, based on the detection signal from the load cell 310 is less than the reference tension, the first vehicle controller 110 determines that the regenerative braking amount of the towed vehicle 200 may be increased.

Accordingly, after the tension applied to the tow bar 300, i.e., the tension calculated as the moving average, is determined to be less than the reference tension, the first vehicle controller 110 determines whether the towing vehicle 100 is decelerating based on the detection signal from the brake pedal sensor 122 (S109). As a result of the determination, when the towing vehicle 100 is determined to be decelerating, the first vehicle controller 110 determines to increase the regenerative braking torque of the towed vehicle 200 by the predetermined torque (S110).

Alternatively, after the tension applied to the tow bar 300, i.e., the tension calculated as the moving average, is determined to be less than the reference tension, the first vehicle controller 110 determines whether the towing vehicle 100 is driving on a downhill slope with less than a designated angle based on the detection signal from the inclination sensor 123 (S109). As a result of the determination, when the towing vehicle 100 is determined to be driving on the downhill slope with less than the designated angle, the first vehicle controller 110 determines to increase the regenerative braking torque of the towed vehicle 200 by the predetermined torque (S110).

Alternatively, after the tension applied to the tow bar 300, i.e., the tension calculated as the moving average, is determined to be less than the reference tension, the first vehicle controller 110 determines whether the weight of the towed vehicle 200 is less than the reference value based on the detection signal from the weight detection sensor 221 (S109). As a result of the determination, when the weight of the towed vehicle 200 is determined to be less than the reference value, the first vehicle controller 110 determines to increase the regenerative braking torque of the towed vehicle 200 by the predetermined torque (S110).

A command to increase the motor regenerative braking torque of the towed vehicle 200 by the predetermined torque may be transmitted from the first vehicle controller 110 to the motor controller 220, which is the lower-level control unit, through the second vehicle controller 210, which is the upper-level control unit, of the towed vehicle 200. The regenerative braking torque increased by the predetermined torque may be applied to the motor 230 of the towed vehicle 200 under the control of the motor controller 220.

As such, when the tension detected by the load cell 310 of the tow bar 300, i.e., the tension calculated as the moving average, is less than the reference tension, and the towed vehicle 100 is decelerating or is driving downhill or the weight of the towed vehicle 200 is less than the reference value, the regenerative braking torque of the towed vehicle 200 is adjusted to be increased, thereby more efficiently performing regenerative braking of the towed vehicle 200, such as obtaining a larger regenerative braking amount by the motor 230 of the towed vehicle 200.

As is apparent from the above description, the present disclosure provides the following effects.

First, when a tension detected by a load cell of a tow bar is greater than or equal to a reference tension, and a towing vehicle is accelerating, driving uphill, or the weight of the towed vehicle is greater than or equal to a reference value, the regenerative braking torque of the towed vehicle is adjusted to be decreased, thereby being capable of preventing an insufficient sense of acceleration of the towing vehicle.

Second, when the tension detected by the load cell of the tow bar is less than the reference tension, and the towing vehicle is decelerating, is driving downhill, or the weight of the towed vehicle is less than the reference value, the regenerative braking torque of the towed vehicle is adjusted to be increased, thereby being capable of more efficiently performing regenerative braking of the towed vehicle, such as obtaining a larger regenerative braking amount by a motor of the towed vehicle.

Third, when the tension detected by the load cell of the tow bar is greater than or equal to a reference durability tension, the driving torque of the driving motor of the towed vehicle is increased, thereby being capable of reducing an excessive tension applied to the tow bar, and preventing the tow bar from being detached or damaged due to the excessive tension applied to the tow bar.

Although the present disclosure has been described in detail with reference to embodiments thereof, the scope of the present disclosure is not limited to the above-described embodiments. It should be appreciated by those having ordinary skill in the art that various modifications and improvements are still within the scope of the present disclosure that is defined in the appended claims and their equivalents.

What is claimed is:

1. A regenerative braking control system for eco-friendly vehicles in a tow mode, the system comprising:

a tow bar coupled between a towing vehicle and a towed vehicle, the tow bar being configured to tow and provide communication between the towing vehicle and towed vehicle;

a load cell mounted on the tow bar and configured to detect a tension applied to the tow bar;

a first vehicle controller of the towing vehicle configured to determine to increase or decrease a regenerative braking torque of the towed vehicle by a predetermined torque based on a detection signal from the load cell; and a second vehicle controller of the towed vehicle configured to receive a regenerative braking torque command signal determined by the first vehicle controller and apply the determined regenerative braking torque to a motor of the towed vehicle.

2. The system of claim 1, wherein the first vehicle controller is configured to command the second vehicle controller to increase a driving torque to drive the towed vehicle by a predetermined torque when the tension applied to the tow bar is determined to be greater than or equal to a reference durability tension greater than a reference tension based on the detection signal from the load cell.

3. The system of claim 2, wherein the reference durability tension is a predetermined tension value used to determine whether the tow bar is detached or damaged.

4. The system of claim 1, further comprising:

an accelerator pedal sensor configured to provide a detection signal to the first vehicle controller to determine a towing vehicle driver's intention to accelerate;

a brake pedal sensor configured to provide a detection signal to the first vehicle controller to determine a towing vehicle driver's intention to decelerate;

an inclination sensor configured to provide a detection signal to the first vehicle controller to determine whether the towing vehicle is driving uphill or downhill; and a weight detection sensor configured to provide a detection signal to the first vehicle controller through the second vehicle controller to determine whether a weight of the towed vehicle has increased or decreased.

5. The system of claim 4, wherein the first vehicle controller is configured to determine to decrease the regenerative braking torque of the towed vehicle by the predetermined torque when the tension applied to the tow bar is determined to be greater than or equal to a reference tension and the towing vehicle is determined to be accelerating based on the detection signal from the accelerator pedal sensor.

6. The system of claim 4, wherein the first vehicle controller is configured to determine to decrease the regenerative braking torque of the towed vehicle by the predetermined torque when the tension applied to the tow bar is determined to be greater than or equal to a reference tension and the towing vehicle is determined to be driving on an uphill slope with a designated angle or more based on the detection signal from the inclination sensor.

7. The system of claim 4, wherein the first vehicle controller is configured to determine to decrease the regenerative braking torque of the towed vehicle by the predetermined torque when the tension applied to the tow bar is determined to be greater than or equal to a reference tension and the weight of the towed vehicle is determined to be greater than or equal to a reference value.

8. The system of claim 4, wherein the first vehicle controller is configured to determine to increase the regenerative braking torque of the towed vehicle by the predetermined torque when the tension applied to the tow bar is determined to be less than a reference tension and the towing vehicle is determined to be decelerating based on the detection signal from the accelerator pedal sensor.

9. The system of claim 4, wherein the first vehicle controller is configured to determine to increase the regenerative braking torque of the towed vehicle by the predetermined torque when the tension applied to the tow bar is determined to be less than a reference tension and the towing vehicle is determined to be driving on a downhill slope with less than a designated angle based on the detection signal from the inclination sensor.

10. The system of claim 4, wherein the first vehicle controller is configured to determine to increase the regenerative braking torque of the towed vehicle by the predetermined torque when the tension applied to the tow bar is determined to be less than a reference tension and the weight of the towed vehicle is determined to be less than a reference value.

11. A regenerative braking control method for eco-friendly vehicles in a tow mode, the method comprising:

coupling a towing vehicle and a towed vehicle by a tow bar so as to enable towing and communication between the towing vehicle and the towed vehicle;

detecting a tension applied to the tow bar by a load cell mounted on the tow bar;

determining, by a first vehicle controller of the towing vehicle, to increase or decrease a regenerative braking torque of the towed vehicle by a predetermined torque based on a detection signal from the load cell; and applying, by a second vehicle controller of the towed vehicle having received a regenerative braking torque command signal determined by the first vehicle controller, the determined regenerative braking torque to a motor of the towed vehicle.

12. The method of claim 11, wherein the first vehicle controller commands the second vehicle controller to increase a driving torque to drive the towed vehicle by a predetermined torque when the tension applied to the tow bar is determined to be greater than or equal to a reference durability tension greater than a reference tension based on the detection signal from the load cell.

13. The method of claim 12, wherein the reference durability tension is a predetermined tension value used to determine whether the tow bar is detached or damaged.

14. The method of claim 11, further comprising:

providing a detection signal to determine a towing vehicle driver's intention to accelerate from an accelerator pedal sensor of the towing vehicle to the first vehicle controller;

providing a detection signal to determine a towing vehicle driver's intention to decelerate from a brake pedal sensor of the towing vehicle to the first vehicle controller;

providing a detection signal to determine whether the towing vehicle is driving uphill or downhill from an inclination sensor of the towing vehicle to the first vehicle controller; and providing a detection signal to determine whether a weight of the towed vehicle has increased or decreased from a weight detection sensor of the towed vehicle to the first vehicle controller through the second vehicle controller of the towed vehicle.

15. The method of claim 14, wherein the first vehicle controller determines to decrease the regenerative braking torque of the towed vehicle by the predetermined torque when the tension applied to the tow bar is determined to be greater than or equal to a reference tension and the towing vehicle is determined to be accelerating based on the detection signal from the accelerator pedal sensor.

16. The method of claim 14, wherein the first vehicle controller determines to decrease the regenerative braking torque of the towed vehicle by the predetermined torque when the tension applied to the tow bar is determined to be greater than or equal to a reference tension and the towing vehicle is determined to be driving on an uphill slope with a designated angle or more based on the detection signal from the inclination sensor.

17. The method of claim 14, wherein the first vehicle controller determines to decrease the regenerative braking torque of the towed vehicle by the predetermined torque when the tension applied to the tow bar is determined to be greater than or equal to a reference tension and the weight of the towed vehicle is determined to be greater than or equal to a reference value.

18. The method of claim 14, wherein the first vehicle controller determines to increase the regenerative braking torque of the towed vehicle by the predetermined torque when the tension applied to the tow bar is determined to be less than a reference tension and the towing vehicle is determined to be decelerating based on the detection signal from the accelerator pedal sensor.

19. The method of claim 14, wherein the first vehicle controller determines to increase the regenerative braking torque of the towed vehicle by the predetermined torque when the tension applied to the tow bar is determined to be less than a reference tension and the towing vehicle is determined to be driving on a downhill slope with less than a designated angle based on the detection signal from the inclination sensor.

20. The method of claim 14, wherein the first vehicle controller determines to increase the regenerative braking torque of the towed vehicle by the predetermined torque when the tension applied to the tow bar is determined to be less than a reference tension and the weight of the towed vehicle is determined to be less than a reference value.

* * * * *